March 21, 1944.　　　A. C. RUGE　　　2,344,642

TEMPERATURE COMPENSATED STRAIN GAUGE

Original Filed Sept. 16, 1939

INVENTOR.
Arthur C. Ruge
BY
ATTORNEYS.

Patented Mar. 21, 1944

2,344,642

UNITED STATES PATENT OFFICE 2,344,642

TEMPERATURE COMPENSATED STRAIN GAUGE

Arthur C. Ruge, Cambridge, Mass.

Original application September 16, 1939, Serial No. 295,207. Divided and this application August 5, 1942, Serial No. 453,682

4 Claims. (Cl. 201—63)

This invention relates generally to strain gauges of the type employing a continuous solid filament of material bonded throughout its effective length to a member subject to strain and whose electrical resistance varies in accordance with strain, the invention relating more particularly to an improved temperature compensated gauge of the foregoing type. This application is a division of my copending application Serial No. 295,207, filed September 16, 1939.

If the test member is subject to temperature variations it will undergo a corresponding change in deformation and accordingly will subject the bonded strain measuring or responsive filament to a variable strain that will introduce a resistance change in the measuring circuit in addition to whatever resistance change may take place in response to strain created by a force applied to the test member. Under certain circumstances it is desirable to compensate for this temperature change so that the gauge is responsive solely to strain induced in the test member by an applied force or, if desired, my improved arrangement may be employed to determine strains induced by temperature changes.

It is an object of my invention to provide an improved temperature compensated gauge that is simple and economical in construction, operation and maintenance and that has a high degree of ruggedness and stability combined with accuracy, sensitivity and reliability.

Figure 1:
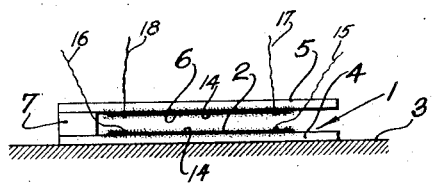
Figure 2:
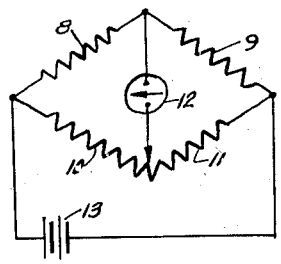

Other objects and advantages will be more apparent to those skilled in the art from the following description of the accompanying drawing in which:

Fig. 1 is a diagrammatic illustration of my improved temperature compensated gauge; and Fig. 2 is a diagrammatic bridge circuit in which my gauge may be employed.

As shown in Fig. 1, a strain gauge generally indicated at 1 has a strain sensitive filament 2 cemented throughout its effective length either directly to a specimen 3 or to a carrying means 4 which, in turn, is cemented to the specimen 3. Broadly either arrangement consists of having the filament bonded to the specimen inasmuch as the intervening element 4 is part of the filament supporting medium for attaching the filament to the specimen to make the filament an integral part of the specimen so as to transmit strain of the specimen fully to the filament. A dummy arm 5, of the same material as specimen 3, has a filament 6 whose material and method of cementing are identical to the strain filament 2. However, the dummy arm 5 is secured at only one end to a spacing block 7 which, in turn, is secured to the specimen 3 or to one end of strain gauge 1. Thus the dummy gauge is supported in the nature of a cantilever directly overlying the strain gauge 1 preferably in slightly spaced relation to the strain responsive filament. The filament, as disclosed in my said copending application, is preferably of the order of .001 to .003 of an inch in diameter. The filament material may be "Advance" and the bonding material "Duco Household Cement," although other filament and bonding materials may be employed as described in said copending application. The advantages and characteristics of the bonded type gauge are also the same as pointed out in said application.

The only functional difference between the strain responsive gauge 1 and the dummy gauge 5 is that the dummy gauge by being supported at only one end 7 cannot have its two ends pulled away from or pushed toward each other in response to tension and compression strains in the specimen and hence the dummy gauge is not subjected to strain of the specimen 3, whereas the strain gauge carrying medium 4 by being positively secured at its two ends or throughout its length, if desired, to the specimen 3 is subjected to the specimen strain. If the dummy gauge is kept at substantially the identical temperature of the specimen, then both filaments will similarly expand or contract with temperature variations and while their electrical resistances will be changed in proportion to the temperature effects, yet by being of identical material the changes due to temperature can be cancelled in the electric measuring circuit to be described. Hence the only relative differential changes in electrical resistance between the two gauges will be purely and solely due to the strain to be measured. The auxiliary gauge 5 is herein called a "dummy" gauge since it serves only as a means of compensating for temperature effects in the primary gauge 1. The dummy arm 5 could be supported throughout its length on the specimen by using a very flexible cement such as rubber. The rubber will not transmit any measurable strains from the specimen to the dummy gauge and hence it will be responsive solely to temperature changes and for this purpose it may be laid on the specimen alongside of a primary gauge. The cement for bonding the filaments to their respective members 4 and 5 is indicated by the speckled areas 14, the filaments being embedded in the cement.

To measure the strain with the temperature compensation, I preferably employ a Wheatstone bridge arrangement as shown in Fig. 2. The filament of the primary strain gauge constitutes one arm 8 of the bridge while the filament of the dummy gauge constitutes the other bridge arm 9. The other bridge arms constitute usual balancing resistances 10 and 11, while a usual galvanometer 12 and battery source of voltage 13 are connected as shown. Suitable leads 15 and 16 and 17 and 18 are connected respectively to filaments 2 and 6. Since any change of temperature affects arms 8 and 9 in equal proportion (whether such changes are due to room temperature variations or due to currents flowing in the filaments), therefore, the bridge does not become unbalanced from temperature variations. By measuring the resistances 10 and 11 necessary to balance the bridge, and knowing the strain sensitivity of the arm 8 and the resistances of the arms 8 and 9, the strain in arm 8 may be computed in a simple manner well understood. In this manner, I have been able to make accurate measurements of the strain in a specimen and especially in a beam in spite of the fact that the filaments of the two gauges constituting arms 8 and 9 have a relatively large thermal coefficient of electrical resistance; and in spite of variations in the room temperature of perhaps 10 degrees C. during the course of the measurements on the beam. I have used a similar technique in measuring strains in metals with equally good results.

As is well-known, the arms of a Wheatstone bridge need not be identical in resistance between when the bridge is balanced, it will stay balanced so long as the two filaments 2 and 6 change in the same proportion. On the other hand, if it is desired to include strains in primary filament 2 due to temperature expansion or contraction, then the dummy filament 6 is mounted upon a piece of material which has a negligible thermal coefficient of expansion or none at all, or negligible relation to the thermal coefficient of expansion of the material in which strains are to be measured. For such purpose I have used a piece of quartz for mounting the dummy filament since quartz has a low thermal coefficient of expansion, Invar being another satisfactory material for the same purpose.

One result of the dummy gauge arrangement is that by choosing the material upon which the dummy filament is mounted a wide variety of combinations of strain-sensitivity may be obtained and that certain measurements, otherwise quite difficult, may be easily obtained with a high degree of accuracy. For instance, if it is desired to measure the thermal coefficient of expansion of a material, the strain responsive gauge disclosed herein is mounted on a piece of the specimen material in question and another identical gauge filament is mounted upon a piece of material of known thermal coefficient of expansion, it being unimportant whether this coefficient is zero or otherwise so long as it is known. When both gauge filaments and the supporting material therefor are at an identical temperature the electrical resistance of each gauge is measured separately or the difference between the electrical resistance of the two gauges is measured in any suitable manner. Such measurements are made at two or more different temperatures depending upon the accuracy desired and range to be covered. In accordance with well-known electrical and physical properties, the data as above obtained are sufficient for determining the thermal coefficient of expansion of the material in question. I have used this method and have found it to be greatly simpler and easier than any other heretofore practice method capable of giving the same accuracy.

The two gauges 2 and 6 are combined into a single self-contained unit as shown in Fig. 1, and hence are adapted to be placed as a unit directly upon the specimen to be tested. The strain-sensitive filament 2 may be cemented throughout its effective length directly to the specimen 3 or if the specimen is an electrical conductor a piece of insulating material such as paper may be first cemented to the specimen and the filament then cemented to the paper. Thereafter the strap or bar of the same kind of material as the specimen 3 is mounted as shown in Fig. 1 with the dummy filament 6 secured as heretofore described. The space between the two gauges may be made as small as desired and a suitable cover placed over the unit to assist in maintaining uniform temperature throughout the gauges. It will be understood that the temperature compensating arrangements disclosed herein are preferably employed with untaut filaments, the only condition being that the filaments of the primary and dummy gauges shall be identically installed and that the filament material for each gauge shall be the same except as otherwise herein pointed out. The arrangement of the wire filament in the dummy is indifferent, but it should, however, be put down in the same manner, i. e., the type of cementing and insulation should be the same so that temperature affects both dummy and primary gauge alike.

From the foregoing disclosure, it is seen that I have provided a very simple, compact and economical temperature compensated gauge that is sturdy and has a high degree of stability and reliability.

It will of course be understood that various changes in details of construction and arrangement of parts may be made by those skilled in the art without departing from the spirit of the invention as set forth in the appended claims.

I claim:

1. A gauge of the type having a continuous solid filament of electrical conducting material adapted to be secured throughout its effective length to a member subject to strain so as to transmit strain of said member fully to the filament and the electrical resistance of said filament varying in accordance with its strain, a piece of material supported at one end in fixed relation to said strain sensitive filament but slightly spaced therefrom so as to be free of any strain in said member but subject to substantially the same temperature thereof, and a second filament of electrical conducting material bonded throughout its effective length to said piece of material so as to be responsive to deformation thereof caused by temperature changes, whereby the two filaments may be connected as part of a measuring circuit so as to cancel out changes in resistance of the strain responsive filament arising from temperature changes therein.

2. The combination set forth in claim 1 further characterized in that said piece of material is of the same kind as the member subject to strain and the second filament is also identical to the material of the strain responsive filament.

3. The combination set forth in claim 1 further characterized in that said piece of material by being supported at one end is in the nature of a cantilever and overlies the strain responsive filament.

4. A gauge of the type having a continuous solid filament of electrical conducting material adapted to be bonded throughout its effective length to a member subject to strain so as to transmit strain of said member fully to the filament and the electrical resistance of said filament varying in accordance with its strain, a piece of material adapted to be supported integrally with said member but to be free of the strain therein, and a second filament of electrical conducting material bonded throughout its effective length to said piece of material so as to be responsive to deformations therein in response to temperature changes, said piece of material having a predetermined thermal coefficient of expansion whereby relative changes in resistance in said filaments arising from temperature variations may be determined.

ARTHUR C. RUGE.